3,453,985
APPARATUS FOR COATING CORES WITH A LAYER OF SUGAR, CHOCOLATE OR LIKE MATERIAL
Bernardus ter Braak, Schiedam, Netherlands, assignor to Gebr. ter Braak N.V., Rotterdam, Netherlands
Filed Jan. 14, 1966, Ser. No. 520,586
Claims priority, application Netherlands, Feb. 5, 1965, 6501468
Int. Cl. A23g 3/26, 3/20
U.S. Cl. 118—19         1 Claim

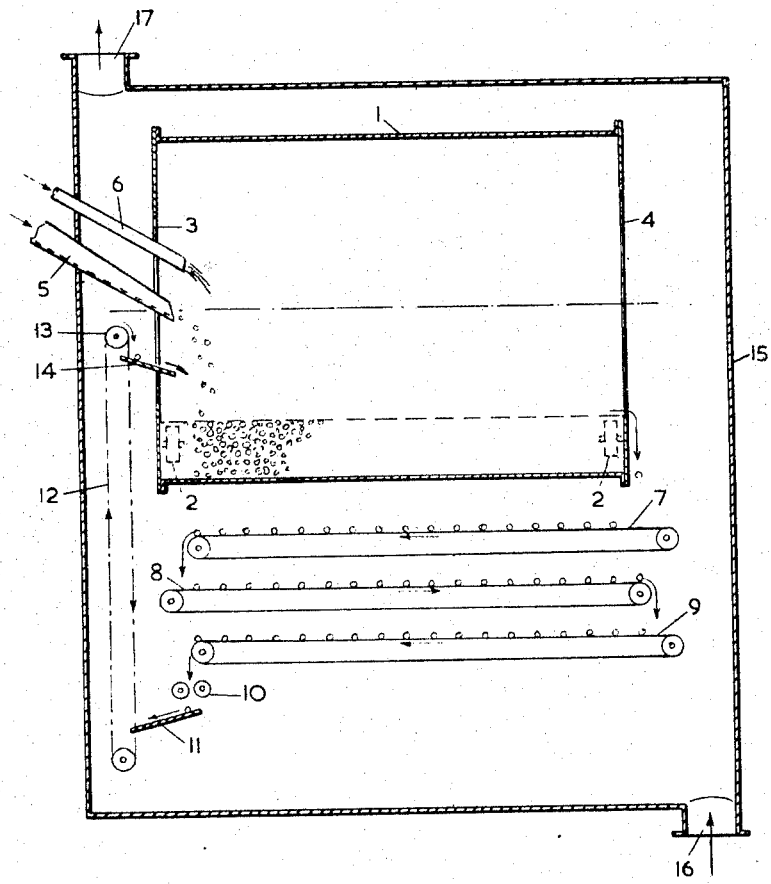

ABSTRACT OF THE DISCLOSURE

Apparatus for coating particles including a rotating drum means for adding uncoated articles and coating material through an inlet. Plural conveyors convey the particles from the discharge end of the drum and deliver them to a classifying means which delivers undersize particles to a means for returning the undersize particles to the inlet of the drum.

---

This invention relates to an apparatus for coating cores with a layer of sugar, chocolate or like material, comprising a horizontal rotating drum, having at its one end an inlet for the cores to be coated and a supply for the coating material and at its other end an outlet for the coated cores.

The invention has for its object to improve an apparatus of this kind in such a manner that all cores in the drum will receive a sufficiently thick and well hardened coating. According to the invention a conveyor mechanism is provided for receiving the cores leaving the drum and said conveyor mechanism returns at least a portion of the cores to the inlet of the drum. Preferably a classifying device is located between the first section and the second section of the conveyor mechanism, which classifies the coated cores corresponding to their thickness and delivers the cores of insufficient thickness to the second section of the conveyor mechanism. The cores returned to the drum, receive therein further coating material, so that the coating of the cores obtains the desired thickness. If a gaseous fluid is passed into the drum and along the conveying mechanism the cores obtain a dry and hard coating.

The invention will be further described with reference to the accompanying drawing showing a diagrammatic sectional elevation of a device according to the invention.

The drum 1, which e.g. may be of cylindrical shape is supported on rollers 2 and is rotated in any suitable manner. The drum has in its front wall an inlet opening 3 and in its rear wall a discharge opening 4, the diameter of which is larger than that of the inlet opening.

The cores to be coated, such as nuts, are continuously supplied to the drum by a chute 5 and a sugar solution or liquid chocolate is supplied by a pipe 6. The cores in the drum are agitated by the rotation of the drum, so that they are completely coated with sugar or chocolate in order to leave the drum over the edge of the opening 4 in the rear wall. The cores thereby fall down onto a conveyor, which may consist of three endless belts 7, 8, 9 running one above the other. The uppermost belt 7 conveys the cores to the left, where they are dropped onto the belt 8 which conveys them to the right where they drop onto the lower most belt 9, which carries them again to the left and delivers the cores to a classifying device 10. The classifying device may consist of two horizontally disposed rolls arranged with a gap therebetween, which gap widens in axial direction as the axes of the rolls are divergent with respect to each other, so that the cores, which have still not obtained a coating of sufficient thickness fall down between the rolls and only the cores having a coating of the desired thickness are discharged at the end of the rolls. The cores falling down between the rolls are guided by an inclined plate 11 to an elevator 12 which at its upper end 13 discharges the cores onto a chute 14 from where they fall again into the drum for further coating. The drum and the conveyor mechanism preferably are enclosed by a casing 15 into which hot air or another gas may be introduced through an inlet 16 in order to flow along the conveying belts and through and along the drum and leaves the casing through an outlet 17. The heating of the cores in the drum may also be obtained by blowing a heating fluid directly into the drum. However, heating in the drum and on the conveyor mechanism is only required when coating the cores with a moist material from which moisture is to be evaporated. When coating cores with a layer of liquid chocolate or the like, however, the cores should be cooled for hardening the coating and if required such cooling may then be effected by using a cooling fluid.

What I claim is:
1. Apparatus for coating cores with successive layers of material, comprising in combination,
   a rotatable mixing drum having an inlet and an outlet,
   first feeding means for delivering uncoated cores into said drum through said inlet,
   means for feeding coating material into said drum through said inlet,
   second feeding means for delivering coated cores of less than a predetermined size into said drum through said inlet,
   classifying means for delivering said coated cores of less than a predetermined size to said second feeding means,
   conveyor means for delivering all of the coated cores discharged through said outlet to said classigying means,
   and means for drying the coated cores as they move along said conveyor means, whereby each of the successive coating layers are hard.

References Cited

UNITED STATES PATENTS

| 1,012,877 | 12/1911 | Mahan | 118—19 |
| 1,319,665 | 10/1919 | Hudson | 209—107 |
| 1,739,642 | 12/1929 | Light | 118—19 |
| 2,880,519 | 4/1959 | Pollock | 34—102 X |
| 3,290,791 | 12/1966 | Keaton | 34—102 X |

FOREIGN PATENTS 674,980   7/1952   Great Britain.

WALTER A. SCHEEL, *Primary Examiner.*
JOHN P. McINTOSH, *Assistant Examiner.*

U.S. Cl. X.R.
118—20